United States Patent
Schlenker et al.

(10) Patent No.: US 9,091,354 B2
(45) Date of Patent: Jul. 28, 2015

(54) SOLENOID VALVE UNIT

(75) Inventors: Dirk Schlenker, Stuttgart (DE); Nabih Othman, Stuttgart (DE)

(73) Assignee: FRAUNHOFER-GESELLSCHAFT ZUR, Munich (DE)

( * ) Notice: Subject to any disclaimer, the term of this patent is extended or adjusted under 35 U.S.C. 154(b) by 1230 days.

(21) Appl. No.: 12/934,273

(22) PCT Filed: Mar. 25, 2009

(86) PCT No.: PCT/DE2009/000403
§ 371 (c)(1),
(2), (4) Date: Dec. 14, 2010

(87) PCT Pub. No.: WO2009/117995
PCT Pub. Date: Oct. 1, 2009

(65) Prior Publication Data
US 2011/0095217 A1  Apr. 28, 2011

(30) Foreign Application Priority Data

Mar. 25, 2008 (DE) .......................... 10 2008 015 497

(51) Int. Cl.
*F16K 15/04* (2006.01)
*F16K 31/06* (2006.01)
(Continued)

(52) U.S. Cl.
CPC ............... *F16K 15/04* (2013.01); *F16K 15/183* (2013.01); *F16K 31/0662* (2013.01); *F16K 31/084* (2013.01)

(58) Field of Classification Search
USPC ................. 251/129.14, 129.15, 333, 359, 12; 137/533.11, 533.13, 533.15
See application file for complete search history.

(56) References Cited

U.S. PATENT DOCUMENTS 2,609,835 A  *  9/1952  Horvay ........................ 137/528
3,225,782 A  *  12/1965  Begley et al. ............ 137/115.02
(Continued)

FOREIGN PATENT DOCUMENTS

CA    2 037 024 C    9/1991
DE      914 086      6/1954
(Continued)

*Primary Examiner* — Atif Chaudry
(74) *Attorney, Agent, or Firm* — Fitch Even Tabin & Flannery

(57) ABSTRACT

A solenoid valve unit is described for shutting off or enabling a throughflow of a medium along a hollow duct, which flows under application of pressure along the hollow duct, having at least one first magnet unit which is fixedly arranged along the hollow duct, which is implemented in the form of a hollow cylinder and is arranged in an axial section along the hollow duct in such a way that the first magnet unit radially completely surrounds the hollow duct and has a flow opening, which is circular in cross-section, on its downstream end, as well as a second magnet unit, which is mounted so it is movable to the first unit and is implemented as a ball, whose ball diameter is greater than the flow opening diameter of the first magnet unit and which, on account of an attractive magnetic force prevailing between both magnet units, can be brought into indirect or direct contact with the first magnet unit and seals the hollow duct in a fluid-tight manner, while the medium loads the first magnet unit under application of pressure opposite to the action direction of the magnetic force. A contour surface, which is angled in relation to a plane defined by the flow opening and surrounds the flow opening, and along which the spherical second magnet unit can be deflected axially and radially relative to the flow opening, indirectly or directly adjoins the flow opening, which is circular in cross-section.

28 Claims, 8 Drawing Sheets

(51) Int. Cl.
*F16K 25/00* (2006.01)
*F16K 15/18* (2006.01)
*F16K 31/08* (2006.01)

(56) References Cited

U.S. PATENT DOCUMENTS

| | | | |
|---|---|---|---|
| 3,795,383 A | | 3/1974 | Lombard et al. |
| 3,893,651 A | * | 7/1975 | Uecker ............... 251/82 |
| 4,763,843 A | | 8/1988 | Becker et al. |
| 5,192,007 A | * | 3/1993 | Blomquist ............... 222/376 |
| 5,320,136 A | | 6/1994 | Morris et al. |
| 7,640,944 B2 | * | 1/2010 | Zakai et al. ............... 137/14 |
| 7,703,485 B2 | * | 4/2010 | Rodewald ............... 141/329 |
| 2006/0102234 A1 | | 5/2006 | Meisel |
| 2007/0069576 A1 | * | 3/2007 | Suzuki ............... 303/155 |
| 2009/0044561 A1 | * | 2/2009 | Dalton et al. ............... 62/398 |

FOREIGN PATENT DOCUMENTS

| | | |
|---|---|---|
| DE | 10 01 073 B | 1/1957 |
| DE | 33 05 604 A1 | 8/1984 |
| DE | 38 02 658 A1 | 8/1989 |
| DE | 40 06 871 A1 | 9/1991 |
| DE | 102 49 936 A1 | 5/2004 |
| EP | 0 213 516 | 3/1987 |
| WO | WO 2008/037430 A1 | 4/2008 |

* cited by examiner

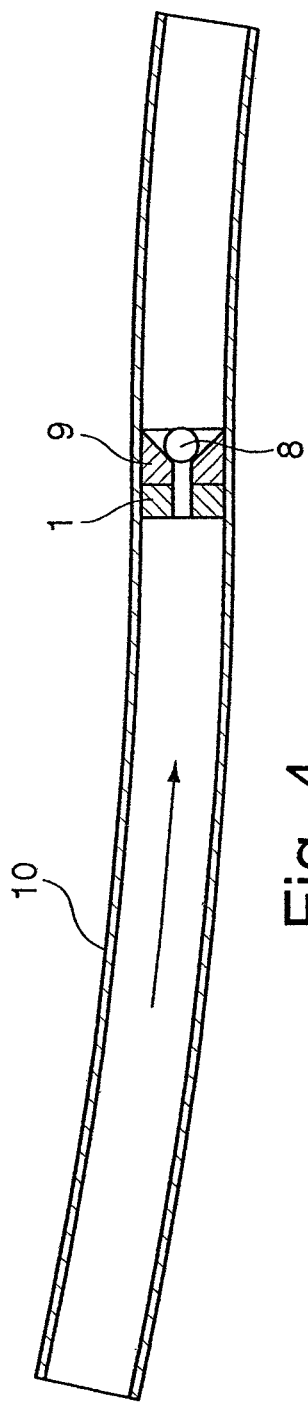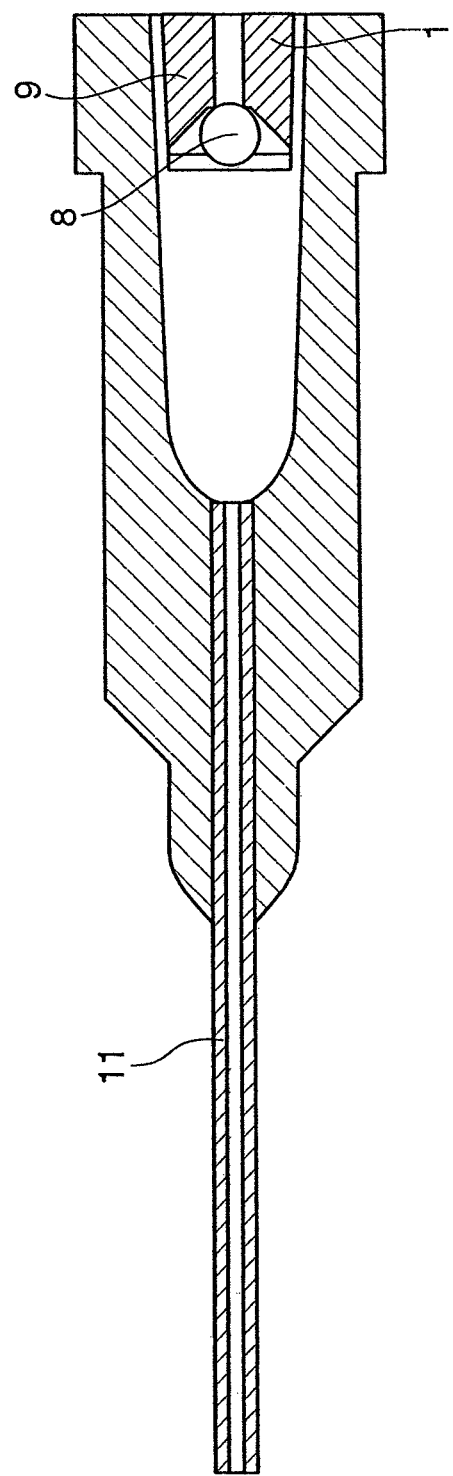

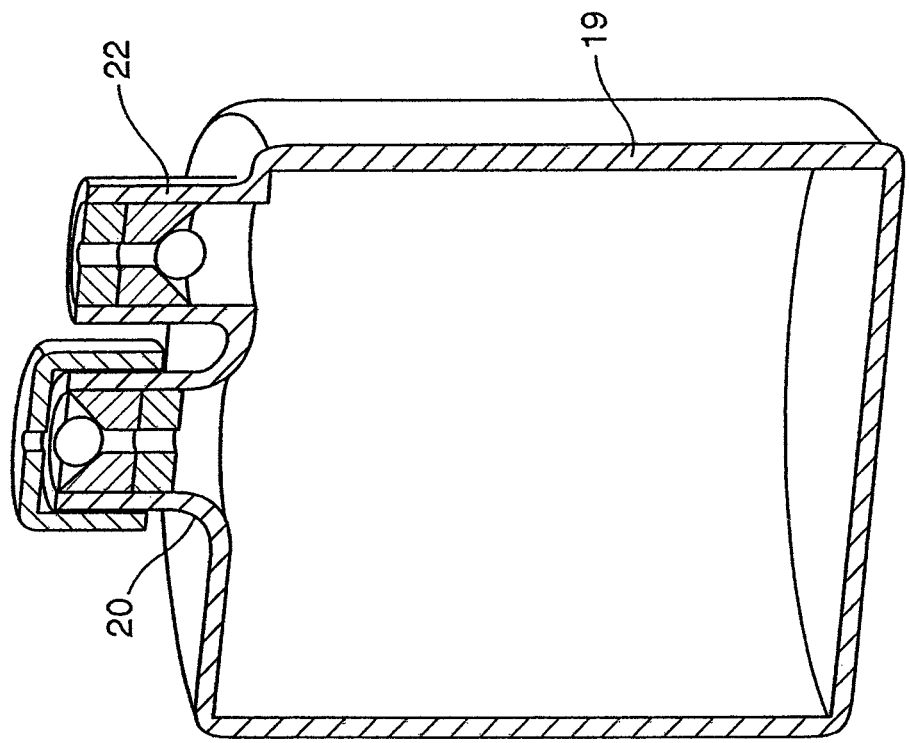
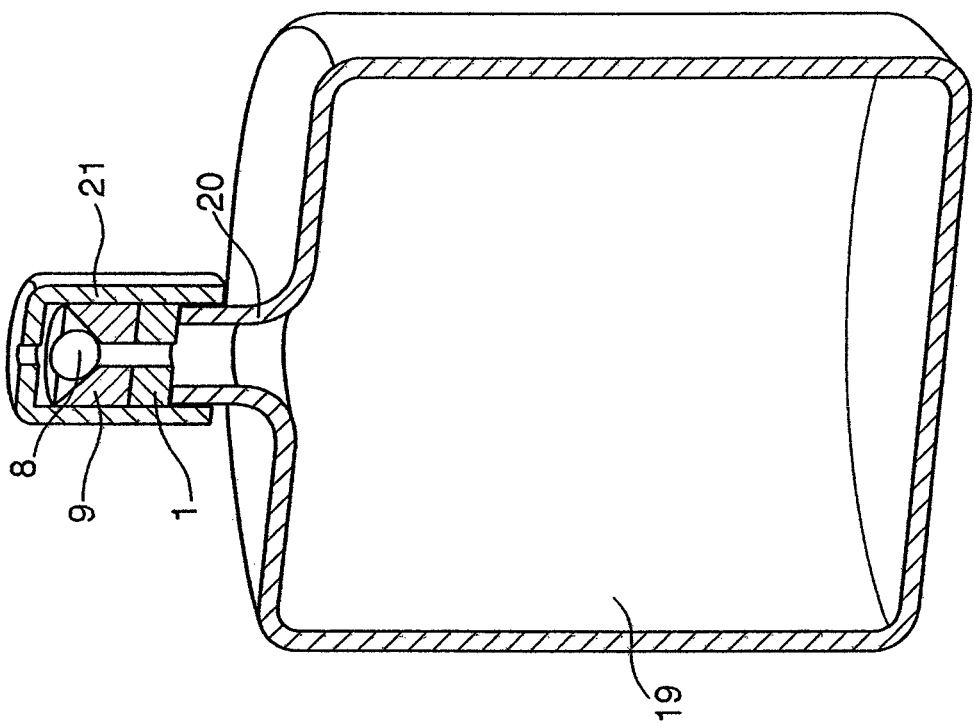

SOLENOID VALVE UNIT

BACKGROUND OF THE INVENTION

1. Field of the Invention

The invention relates to a solenoid valve unit for shutting off or enabling a throughflow of a medium along a hollow duct, which flows along the hollow duct under application of pressure, having at least one first magnet unit which is fixedly arranged along the hollow duct and a second magnet unit, which is mounted so it is movable in relation to the first magnet unit, and which can be brought into indirect or direct contact with the first magnet unit on account of an attractive magnetic force prevailing between the two magnet units, and seals the hollow duct in a fluid-tight manner, while the medium loads the first magnet unit under application of pressure opposite to the action direction of the magnetic force.

2. Description of the Prior Art

Devices for the metered dispensing of viscous media, preferably low-viscosity, medium-viscosity, and high-viscosity liquids, such as oils, greases, adhesives, and soldering pastes, to name only a few, are often also known under the name "dispenser" and are used in greatly varying technical areas, such as precision engineering, nanotechnology, and microtechnology, and in particular, in the fields of microelectronics, microoptics, and micromechanics and also in biotechnology and medical technology. Typical applications of such dispenser systems for medium-viscosity and high-viscosity media relate, for example, to the exact dispensing and positioning of ultrasmall adhesive drops for joining in electronics manufacturing, the lubrication of bearings using oils and greases in mechanical engineering, preferably in the field of micromechanics, and the continuous or cyclic delivery of reagents in the chemical industry or for purposes of analysis technology or also for administering ultrafine dosed liquid pharmaceuticals for patient care, in particular in intensive medicine.

An overview of dispenser systems for medium-viscosity and high-viscosity media, which are capable in particular of generating and placing drops, so-called dots, in the context of cyclic dispensing of media, can be taken from an article by F. Kohler "Punkt für Punkt—Die Techniken für das Dispensen von Lotpasten [point for point—the technologies for the dispensing of solder pastes]", published in "Productronic" (1991), issue 4, pages 18 to 20. In addition to the time/pressure cartridge dosing systems, rotation screw dosing systems, peristaltic dispensing systems, and piston positive displacement dosing systems described therein, solenoid valve systems are additionally known, whose valve mechanism is based on a mutual adaptation of prevailing magnetic forces to the flow or delivery pressure, which originates from a media flow to be dosed using the valve unit.

In this context, reference is made to DE 38 02 658 A1, in which a solenoid valve is described, whose mode of operation is determined by the axial position of a permanent magnet, which is mounted so it is movable axially relative to the hollow duct. On account of the magnetic conditions of the permanent magnets provided in the solenoid valve, the valve configuration remains open in a base position which is unloaded by external force actions, particularly on account the axially movable magnet unit experiencing an axially acting repelling force through the magnet unit which is also provided in the hollow duct. In contrast, if a corresponding axial flow pressure or volume flow acts on the valve seat, it is axially displaced and moved against a valve needle until the valve unit passes into a closed state upon reaching a maximum value flow. The known solenoid valve may be used in a particularly advantageous way as a magnetic regulating valve through the shaping of the valve body and the desired large longitudinal mobility of the valve seat in the axial direction. For these purposes, optical sensors are provided along the cavity wall, in order to detect the axial location of the valve seat.

An automatically operating shutoff valve, in particular for oil burners, is disclosed in EP 0 213 516, which is to prevent dripping of oil after ending the burning action. For this purpose, the shutoff valve provides a longitudinally-movable shutoff body, which entirely or partially comprises a permanent-magnetic material. In a starting state, the shutoff body is pressed in a fluid-tight manner on one side against the component, which is designated as the armature, and which has a central hole through which liquid oil is fed. If an oil flow is applied, it presses the shutoff body into an axially distant position from the armature while overcoming the magnetic retaining forces, so that an oil flow occurs through the oil nozzle. The shutoff body encloses an intermediate gap using the sleeve-type element which surrounds it.

A magnetic shutoff valve, which comprises a plate valve unit, which is combined with a permanent magnet, is disclosed in U.S. Pat. No. 5,320,136. In a starting state, the plate valve is located in a closed valve position through mutual magnetic attraction of the existing magnets, while in contrast when a flow pressure is applied to the plate valve and exceeds the magnetic retaining force, an axial deflection of the plate valve is caused, whereby the valve is opened.

A magnetic shutoff valve is disclosed in U.S. Pat. No. 3,026,903, in which a magnetic ball is mounted so it is axially movable inside a magnetic sleeve. In a starting state, the ball is located in an upper area and is in fluid-tight contact with a sealing disc. As soon as a medium flow is applied through the valve, the ball is deflected against the magnetic retaining force, whereby the shutoff valve opens.

Furthermore, a valve unit according to the species is disclosed in WO 2008/037430, which represents prior art published after the present application and represents the most similar prior art.

SUMMARY OF THE INVENTION

The invention is a solenoid valve unit for shutting off or enabling a throughflow of a medium along a hollow duct in such a way that, on the one hand, the construction of solenoid valves is simplified and, in addition, it is to be ensured that the dosing with which medium dispensing occurs can be performed at comparable or better quality than is possible using previously known solenoid valve units. In particular, it is to be ensured that the danger of dripping upon closing of the solenoid valve unit can be completely prevented. In addition to the required simple and therefore also cost-effective construction for the solenoid valve, a solenoid valve is additionally also provided which can be implemented in a miniaturized form and has a high integration capability.

A multitude of diverse novel possible applications is provided by the high integration capability.

The solenoid valve unit according to the invention for shutting off or enabling a throughflow of a medium along a hollow duct, which flows under application of pressure along the hollow duct, having at least one first magnet unit which is fixedly arranged along the hollow duct, in the form of a hollow cylinder and is arranged in an axial section along the hollow duct. The at least one first magnet unit radially completely surrounds the hollow duct and has a flow opening which is circular in cross-section on its downstream end. A second magnet unit is mounted to be movable to the first magnet unit and is implemented as a ball, whose ball diameter is greater than the flow opening diameter of the first magnet unit and which can be brought into indirect or direct contact with the first magnet unit on account of an attractive magnetic force prevailing between the two magnet units. The second magnet unit seals the hollow duct in a fluid-tight manner, while the medium loads the first magnet unit under the application of pressure opposite to the action direction of the magnetic force. The second magnet unit has a contour surface, which is angled in relation to a plane of the flow opening and surrounds the flow opening, and along which the spherical second magnet unit is deflectable axially. The second magnet unit radially relative to the flow opening, indirectly or directly adjoins the flow opening, which is circular in cross-section.

According to the invention, no further precautions are required to prevent the movable second magnet unit from being entrained in the flow direction by the flow pressure of the medium flowing through the solenoid valve unit, particularly on account the second magnet unit, which is implemented as a ball, can be deflected laterally along the contour surface encompassing the flow opening. Any safety mechanisms to be provided downstream from the solenoid valve unit against uncontrolled removal of the second magnet unit from the solenoid valve, as is the case in the prior art, become superfluous according to the invention.

If the solenoid valve implemented according to the invention is in the so-called idle state, in which the flow pressure of the medium, which loads the spherical second magnet unit, applied along the solenoid valve is less than the magnetic attractive force acting between the first and second magnet units, the solenoid valve remains closed. That is, the spherical second magnet unit closes in a fluid-tight manner at the circular flow opening edge of the first magnet unit. A defined increase of the flow or delivery pressure of the medium along the hollow duct above the magnetic attractive force acting between both magnet units results in automatic opening of the solenoid valve. In this case, the spherical second magnet unit flaps or rolls laterally away along the contour surface, which indirectly or directly radially adjoins the circular flow opening of the hollow-cylindrical first magnet unit, and thus releases the flow pathway through the solenoid valve unit. According to the invention, the contour surface which indirectly or directly radially surrounds the flow opening is implemented as angled in relation to a plane defined by the flow opening. The contour surface preferably adjoins the flow opening in a funnel shape or conically expands in the flow direction, so that the spherical second magnet unit is pressed away both radially and also axially from the flow opening by the flow-induced opening force. In addition, the circular flow opening and the funnel-shaped or conically expanding contour surface adjoining the flow opening in the flow direction contribute to preventing flow dead spaces, in which air bubbles could form and accumulate. On account of the geometric conditions in the area of the flow opening which are determined by round shapes, loss-reduced flow properties may be obtained, which contribute to particularly good quantity dosing in particular upon the dispensing of ultrasmall quantities.

It is to be noted that in the open position, independently of the strength of the flow-related opening force, the spherical second magnet unit always remains in physical contact with the contour surface encompassing the flow opening and is in no way entrained in the flow direction by the media flow penetrating the solenoid valve unit. The implementation of the contour surface angled in relation to the plane defined by the flow opening, which preferably adjoins the flow opening of the first magnet unit in a funnel shape or conically expanding in the flow direction, offers a type of ramp surface for the spherical second magnet unit, along which the spherical second magnet unit is deflected axially and simultaneously also radially relative to the flow opening upon excessive flow pressure in the course of a displacement action.

Fundamentally, for the funnel opening angle $\alpha$, $0°<\alpha<90°$, the funnel opening angle $\alpha$ is understood as the angle between the axial longitudinal axis of the hollow duct enclosed by the first magnet unit and a straight line which lies in the contour surface and intersects the longitudinal axis of the hollow duct. The selection of the funnel opening angle $\alpha$ is to be made as a function of the dimensions of the circular flow opening of the first magnet unit and the spherical second magnet unit and is additionally also a function of the type of the medium penetrating the solenoid valve unit, which can be liquid, gaseous, or viscous. Preferred angles for $\alpha$ are between 10° and 50°.

In particular with respect to the implementation of a rapidly responding solenoid valve unit, which is additionally capable of depositing ultrasmall quantities of medium, for example, in the milliliter, microliter, or nanoliter range, the above design parameters are adapted so that even slight variations of the delivery pressure around the magnetic retaining force acting between both magnet units allow a high-frequency change between an open valve position and a closed valve position.

In particular upon reclosure of the solenoid valve, precautions are to be taken so that the axially and laterally deflected spherical second magnet unit rapidly and precisely assumes a position upon dropping of the delivery pressure in which it closes the flow opening of the first magnet unit in a fluid-tight manner. During this action, self-centering, inertia-related oscillating movements of the spherical second magnet unit on the opening edge of the flow opening are to be prevented. This phenomenon can be precluded by the angled contour surface implemented according to the invention, which surrounds the flow opening, so that any dripping can be prevented during the closing action of the solenoid valve unit.

Various embodiments suggest themselves for the implementation of a solenoid valve unit implemented according to the invention. A simplest embodiment implements the first magnet unit in integral construction. That is, the cylindrical basic shape has the contour surface implemented as angled in relation to the plane defined by the flow opening on its downstream end. In a preferred way, the first magnet unit is manufactured from permanent magnetic material, so that the second magnet unit does not necessarily also have to be manufactured from a permanent magnetic material. Rather it is possible to make the spherical second magnet unit with a ferromagnetic material. It is also to be noted that the solenoid valve unit implemented according to the invention can also be implemented by providing a first magnet unit manufactured from ferromagnetic material and a spherical second magnetic unit manufactured from permanent magnetic material.

In contrast to the simple embodiment outlined above, a further embodiment provides the funnel-shaped end shape as a separate component provided separately from the first hollow-cylindrical magnet unit, which preferably comprises a nonmagnetic material. Such a component, which is also referred to hereafter as a spacer, contributes to adapting the magnetic attractive force which prevails between both magnet units within certain ranges and additionally improves the fluid tightness of the solenoid valve in the closed position by suitable material selection.

It is also possible to provide the spherical second magnet unit superficially with a surface coating which improves the fluid tightness in the closed solenoid valve position, as for example, with a suitable elastic material layer, such as plastic or rubber. A chamfer of the opening boundary directly encompassing the flow opening along the first magnet unit or the spacer element described above is also suitable for improving the fluid tightness.

A further exemplary embodiment of the solenoid valve unit implemented according to the invention provides, directly at the flow opening, an annular surface section located in the plane of the flow opening, on whose radial peripheral boundary the contour surface, which is angled in relation to the plane of the flow opening, adjoins and conically expands in the flow direction. Through this measure, the opening action is made easier and can occur more rapidly in time, in particular because when the opening force initiated by the delivery pressure exceeds the magnetic retaining force between both magnet units, the spherical second magnet unit is initially essentially only laterally deflected radially to the flow opening, before the spherical magnet unit comes into contact with the angled contour surface for the further radial and axial deflection. On the other hand, the annular surface section ensures that the spherical second magnet unit presses in a fluid-tight manner against a sharp-edged peripheral boundary, which surrounds the flow opening, along a contact line.

A plurality of advantages are connected to the solenoid valve unit according to the invention, which are described in sequence hereafter.

On account of a completely deenergized operating capability of the solenoid valve unit according to the invention and the simple construction, in which only two components operationally linked to one another are required, manifold integration possibilities open up in existing fluid systems, not least on account of the ability to miniaturize the solenoid valve. The possible configuration of the valve in direct proximity to the outlet opening of dosing systems and the thus achievable reduction of the undefined deliverable residual volume adjoining the valve are particularly advantageous. Any problems which would be connected to an electrical power supply may also be completely precluded, such as heating acting on the viscosity of the medium.

The closing action of the solenoid valves occurs in a way in which the spherical second magnet unit is driven out of a position downstream from the flow opening opposite to the flow direction by the magnetic attractive force toward the flow opening and closes it in a fluid-tight manner. Through the restoring opposite to the flow direction, supported by the favorable flow geometry of the second magnet unit, a pressure impulse is avoided on the medium existing between valve and outlet opening, which would result in dripping.

The high tightness with which the solenoid valve unit closes can additionally be increased in that a type of sealing lip is provided in the area of the flow opening, either directly on the first magnet unit or on the attached spacer element, for example, by applying a sealant on the opening edge of the flow opening. The same measure can be taken on the spherical second magnet unit, in that, as already mentioned above, it is superficially provided with a corresponding sealing layer.

Any dead spaces or undercuts are avoided by the hollow-cylindrical geometry of the first magnet unit, which is closable on one side by the spherical second magnet unit, whereby the accumulation of air bubbles or the formation of recirculation flows inside the solenoid valve configuration may be prevented.

The simple construction of the solenoid valve unit implemented according to the invention allows a direct and cost-effective integration in common products, such as, for example, in packages, such as tubes, containers, bags, cans, etc., which are produced in the course of injection-molding technology. Through the cost-effective production capability of the solenoid valve unit according to the invention, there is a possibility for use in adaptable disposable components, which are also producible in injection molding technology, such as cartridges or comparable products. The already described possibility of miniaturization allows multiple configurations of the solenoid valve unit using planar arrayed distribution, which is used for surface lubrication between at least two rolling or sliding bodies. Further details in this regard are apparent from the following description with reference to the exemplary embodiments.

Fundamentally, the solenoid valve unit according to the invention may be used for quantity-dosed dispensing of liquid, pasty, and gaseous media, and for media which have a heterogeneous consistency, such as liquids or viscous materials in which solid particles are intercalated. In addition to the above-mentioned high robustness of the solenoid valve unit implemented according to the solution, its low susceptibility to breakdown is also to be emphasized, in particular on account the solenoid valve is only composed of two or at most three components.

For quantity-dosed media dispensing through the solenoid valve unit implemented according to the invention, a targeted deflection of the spherical second magnet unit relative to the flow opening of the first magnet unit or to the spacer element is required. Fundamentally, three different functional mechanisms are available for such a controlled deflection of the spherical lateral magnet unit.

On the one hand, the delivery pressure, with which the medium is conveyed under the application of pressure along the hollow duct through the solenoid valve unit can be intentionally varied with the aid of a delivery pump. If the delivery pressure is increased above the magnetic retaining force which acts between both magnet units, the valve opens, in contrast, if the delivery pressure is reduced in relation to the magnetic retaining force, the valve closes automatically.

A second variant provides the presence of an external magnetic field, by which the magnetic retaining force acting between both magnet units of the valve unit is largely compensated for in relation to the applied delivery pressure, so that the delivery pressure is capable of deflecting the spherical magnet unit from the closed idle position. The external magnetic field required for the compensation can be produced by spatial approach between a solenoid valve unit and an external magnet unit, as for example, a permanent magnet or electromagnet. In this case, the opening and closing of the solenoid valve unit is not implemented by variation of the delivery pressure along the media flow, but rather by controlled approach of the solenoid valve unit relative to an external magnetic field source.

A third alternative provides, similarly to the first alternative, a variation of the delivery pressure along the media flow, however, it is not varied by a delivery pump, but rather with the aid of a bypass dynamic pressure nozzle. Specifically, it is assumed for this purpose that the medium to be dispensed by the solenoid valve unit is stored in a cartridge, which is connected to a dispenser needle with the solenoid valve unit implemented according to the invention being provided between the cartridge and the dispenser needle. The cartridge is closed by a piston unit, on which a specified air dynamic pressure acts, which originates from an air pressure source. For variation of the air dynamic pressure, a bypass line is provided between the air pressure source and the piston unit, which runs parallel to the dispenser needle, through which the dosed media dispensing occurs, and whose open end opens into a shared plane with the dispenser needle opening. When the dispenser needle has connected thereto, the open end of the bypass line which approaches a substrate surface, on which dosed media dispensing is to be performed, the air dynamic pressure loading the piston unit increases as the nozzle distance becomes less. This occurs because a free outflow of air through the bypass line is prevented by the approach to the substrate surface and an increased dynamic pressure thus acts on the piston unit, which results in opening of the solenoid valve. When the nozzle configuration is lifted or moved away from the substrate surface, the air dynamic pressure loading the piston unit is decreased, because the flow pathway to the bypass line is released again, whereby the valve finally closes automatically.

The constructive implementation of the solenoid valve unit according to the invention and preferred exemplary uses are explained in greater detail hereafter on the basis of concrete exemplary embodiments.

BRIEF DESCRIPTION OF THE DRAWINGS

The invention is described for exemplary purposes hereafter without restriction of the general idea of the invention on the basis of exemplary embodiments with reference to the drawings. In the figures:

FIG. 1 shows a schematic longitudinal section through a solenoid valve unit implemented according to the invention;

FIGS. 3a, b and c show exploded views of a solenoid valve unit implemented according to the invention in which

FIG. 4 shows a modular implementation of a solenoid valve unit along a tube section;

FIG. 5 shows a longitudinal section through a dispenser needle configuration having integrated solenoid valve unit;

FIG. 10 shows a longitudinal section through a container having a cover closure element having a solenoid valve unit implemented according to the invention;

FIG. 11 shows a vessel having an entry and exit opening, each provided with a solenoid valve unit implemented according to the invention;

DETAILED DESCRIPTION OF THE EXEMPLARY EMBODIMENTS

Industrial Applicability

Figure 2A:
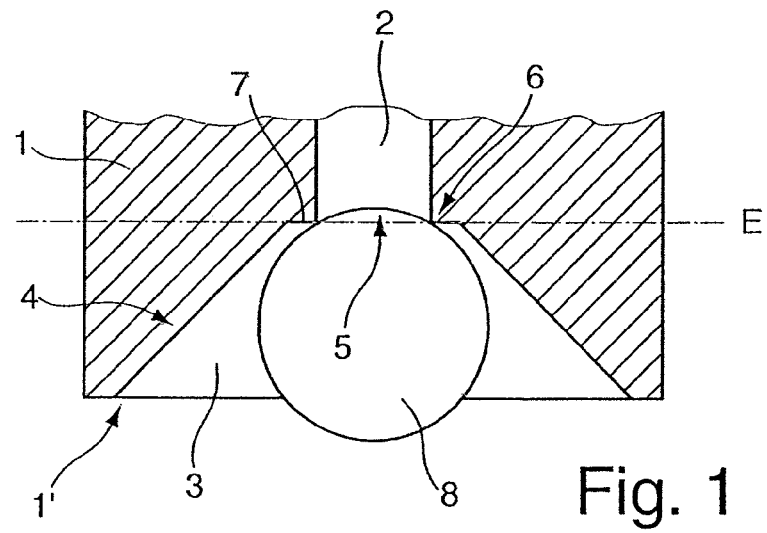
FIGS. 2a and b show longitudinal sections through an alternative implementation of a solenoid valve unit implemented according to the invention in closed and open positions.

FIG. 1 shows a schematic longitudinal section through a simplest embodiment of the solenoid valve unit implemented according to the invention, which has a first magnet unit 1, preferably comprising permanent-magnet material, which has a hollow-cylindrical basic shape and surrounds an inner hollow duct 2. The first magnet unit 1 has a downstream end 1', which has a funnel-shaped recess 3. The funnel-shaped recess 3 is laterally defined by a contour surface 4 oriented at an angle in relation to the plane E shown in FIG. 1, which also represents the surface of the first magnet unit 1. Along the plane E, the flow opening 5 of the hollow duct 2 is located, which has a circular cross-section and is enclosed by a sharp-edged peripheral boundary 6 implemented in a circular line. An annular surface section 7 is provided radially directly adjoining the peripheral boundary 6, which extends in the same plane E as the flow opening 5. Such a surface section 7 is not necessarily to be provided.

For the one-sided closing of the hollow duct 2, a spherical second magnet unit 8 is provided, whose ball diameter is dimensioned larger than the opening cross-section of the flow opening 5. The second magnet unit 8 comprises a permanent-magnetic or ferromagnetic material, so that a mutual attractive magnetic force prevails between the magnet unit 1 and the magnet unit 8. In an idle position shown in FIG. 1, the second magnet unit 8, which is mounted completely freely in relation to the magnet unit 1, assumes the position shown in FIG. 1 and closes the hollow duct 2 in a fluid-tight manner at the peripheral boundary 6.

Furthermore, it is assumed that the solenoid valve shown in FIG. 1 is used for controlled media dispensing. For this purpose, the hollow duct 2 shown in FIG. 1 is connected to a corresponding media reservoir (not shown), so that a pressure force oriented opposite to the magnetic mutual attractive force acting between both magnet units 1 and 8 prevails along the hollow duct 2 in the direction toward the spherical second magnet unit 8.

If the pressure force loading the second magnet unit 8 via the medium exceeds the magnetic retaining force, the second magnet unit 8 is deflected axially and radially laterally to the hollow duct 2. That is, the magnet unit 8 is really displaced along the contour surface 4 extending in a funnel shape and remains in physical contact with the contour surface independent of the pressure force loading the second magnet unit.

Figure 2B:
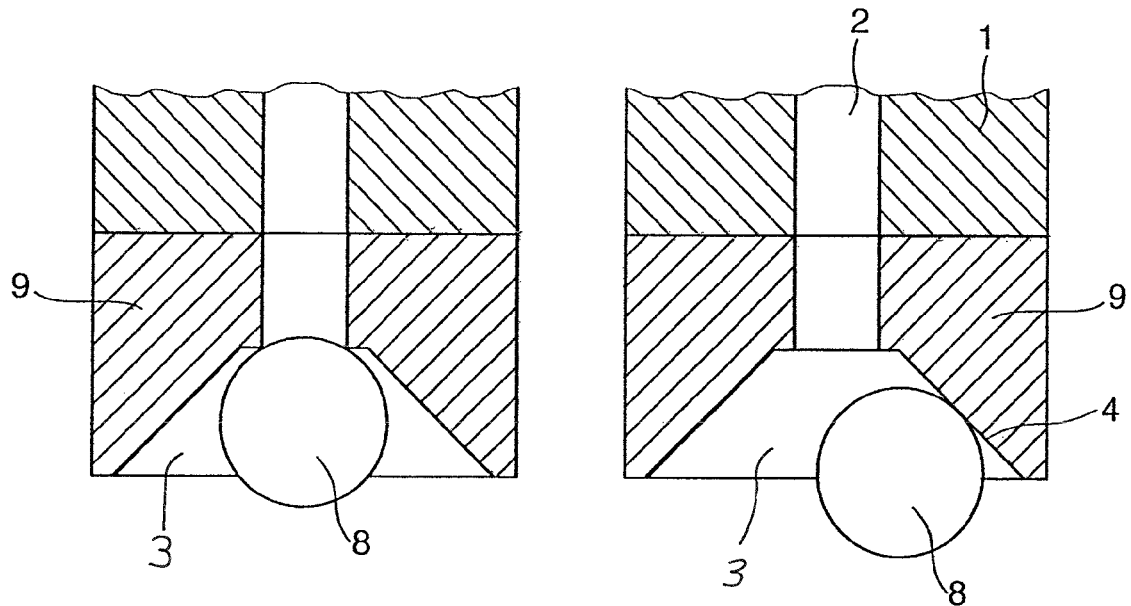
FIGS. 2b and 3c show an exemplary embodiment produced using injection-molding technology.

In FIGS. 2a and b, longitudinal sections through a further embodiment of a solenoid valve unit implemented according to the invention are shown, FIG. 2a illustrates the closed state and FIG. 2b illustrates an open valve state. In both cases, in contrast to the exemplary embodiment according to FIG. 1, a spacer element 9 is provided directly on the first magnet unit 1, which advantageously comprises a nonmagnetic material and, similarly to the downstream end 1' according to the exemplary embodiment in FIG. 1, has a funnel-shaped recess 3. The spacer element 9 is essentially used as an adjustment capability for the magnetic attractive force prevailing between both magnet units 1 and 8. It can thus be reduced, in that the thickest possible spacer element 9 is used. A closed solenoid valve position is shown in FIG. 2a and in FIG. 2b it is assumed that any medium acts under application of pressure against the second magnet unit 8 along the hollow duct 2, so that it is deflected against the magnetic retaining force both axially and also radially along the funnel-shaped contour surface 4, whereby the flow opening 5 of the hollow duct 2 is released and free media dispensing is made possible. The second magnet unit 8 remains in physical contact with the contour surface 4 independent of the applied pressure.

If the delivery pressure with which the medium is conveyed along the hollow duct 2 is reduced by the amount of the magnetic attractive force prevailing between the two magnet units, the second magnet unit 8 really slides in a self-centering way along the inclined funnel-shaped contour surface 4 in the direction of the flow opening 5 of the hollow duct 2 and closes it in a fluid-tight manner.

Figure 3A:
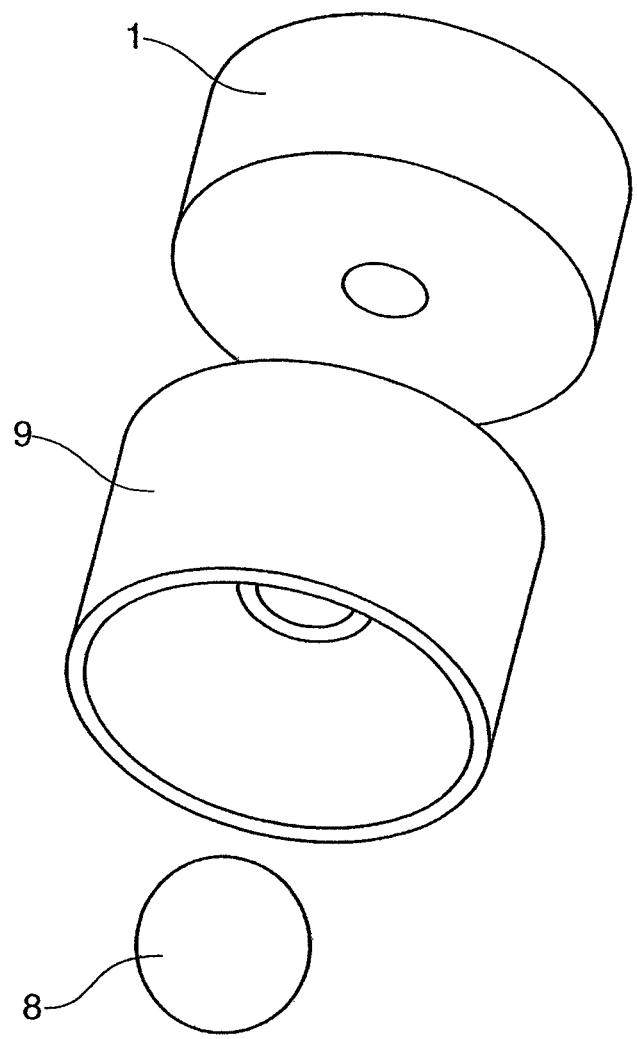

An exploded view of a solenoid valve unit is shown in FIG. 3a, which comprises three parts, which are the first, hollow-cylindrical magnet unit 1, the spacer element 9 adjoining axially thereon, and the spherical second magnet unit 8. As already explained above, the spacer element 9 is only optionally to be provided and is primarily used through suitable material selection and dimensioning for targeted adjustment of the magnetic attractive force acting between the first magnet unit 1 and the second magnet unit 8.

Figure 3B:
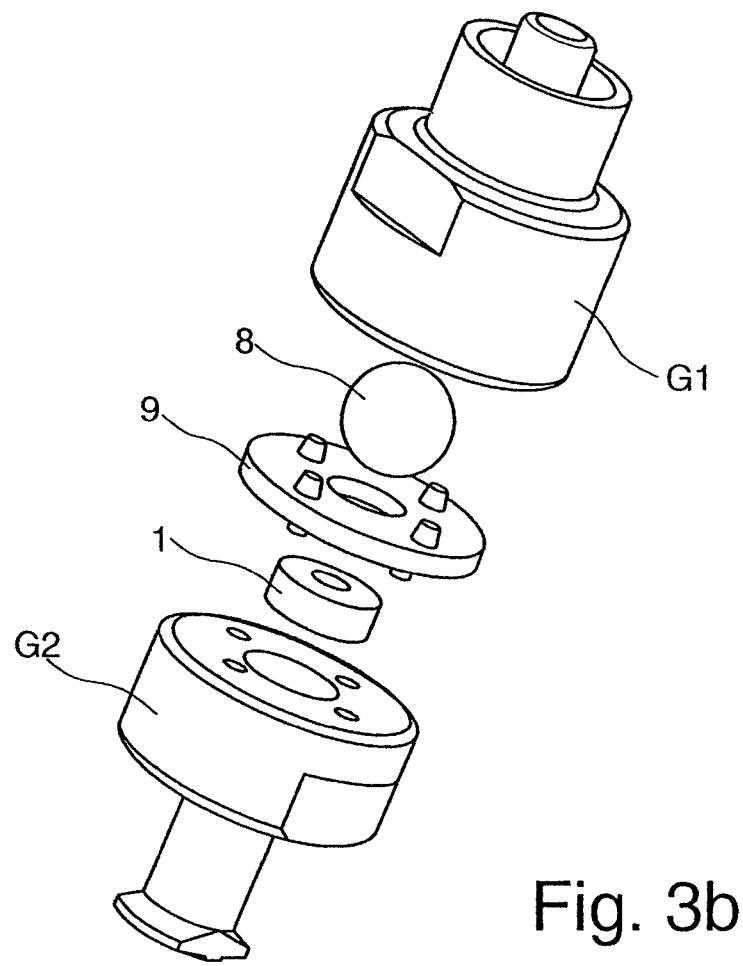
Figure 3C:
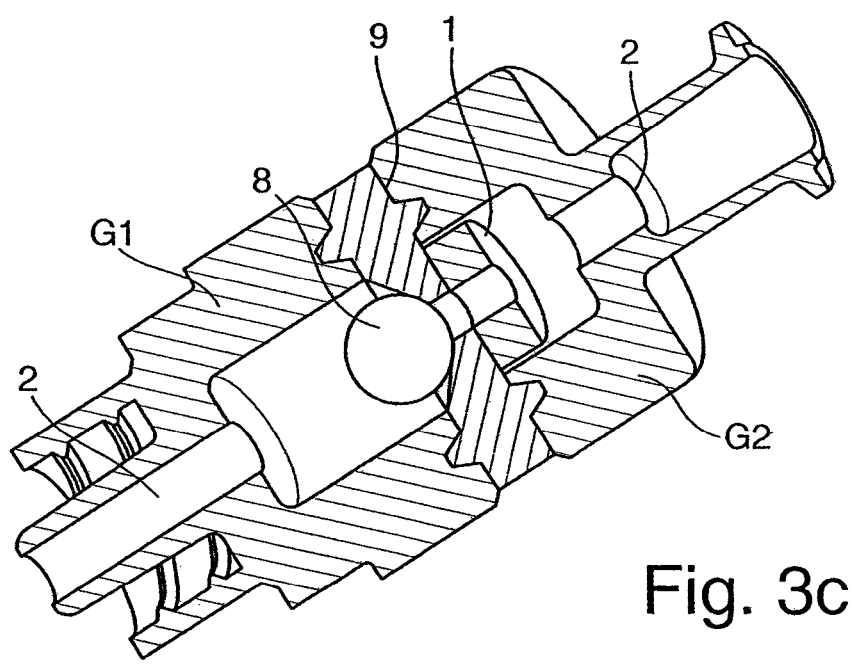

FIGS. 3b and 3c, which also show a solenoid valve according to the invention having a hollow-cylindrical first magnet unit 1, a spacer element 9, and a spherical second solenoid valve unit 8, illustrate the use of the solenoid valve in an injection-molded part, which encapsulates the solenoid valve unit. The housing comprises two injection-molded housing parts G1 and G2, which preferably are manufactured from thermoplastic and each enclose a hollow duct 2, along which the solenoid valve unit implemented according to the invention is placed in the way obvious in FIGS. 3b and c. The spacer element 9 is preferably color marked or coded and can be implemented to be suitably thick depending on the desired magnetic retaining force. For easier recognition of a respective spacer element 9, it is obvious from the outside in the assembled form of the valve module in the form of a ring (see FIG. 3c). In this way, a suitable solenoid valve for the corresponding intended application can be selected in each case from a plurality of encapsulated solenoid valve units, which differ through the thickness of the respective spacer element 9 and thus differ in the valve opening behavior but otherwise have identical constructions.

The simple design construction may be seen on the basis of FIGS. 3a-c, which ensures cost-effective production, on the one hand, and offers the capability of miniaturization and an integration capability connected thereto, on the other hand, and proves that the solenoid valve unit according to the invention is wear-free and is not subject to any breakdown susceptibility in operation.

The integration of the solenoid valve unit implemented according to the invention along a flexible hollow line 10 is shown in FIG. 4. For this purpose, it is assumed that a medium in the form of a liquid, a viscous medium, or a gas is guided in the flow direction along the hollow line 10 along the arrow illustration shown in FIG. 4. The first magnet unit 1 and the spacer element 9, fixedly connected thereto, are fixedly connected to the inner wall of the hollow line 10. In the illustration shown in FIG. 4, the spherical second magnet unit 8 is seated flush on the flow opening of the solenoid valve unit and closes it in a fluid-tight manner. In contrast, if the flow pressure exceeds the magnetic attractive force between first and second magnet units, the spherical magnet unit 8 is deflected along the funnel-shaped contour surface 4, whereby the solenoid valve unit is transferred into the open position and a flow passage through the solenoid valve unit is made possible.

FIG. 5 shows a longitudinal sectional illustration through a dispenser needle 11 along the solenoid valve unit according to the invention, comprising a first magnet unit 1, spacer element 9, and the spherical second magnet unit 8, which is placed upstream from the dispenser needle. Through the small installation space which is required in the miniaturized implementation of the solenoid valve unit implemented according to the invention, the implementation of even ultrasmall dispenser needle configurations is possible.

Figures 6A, 6B:
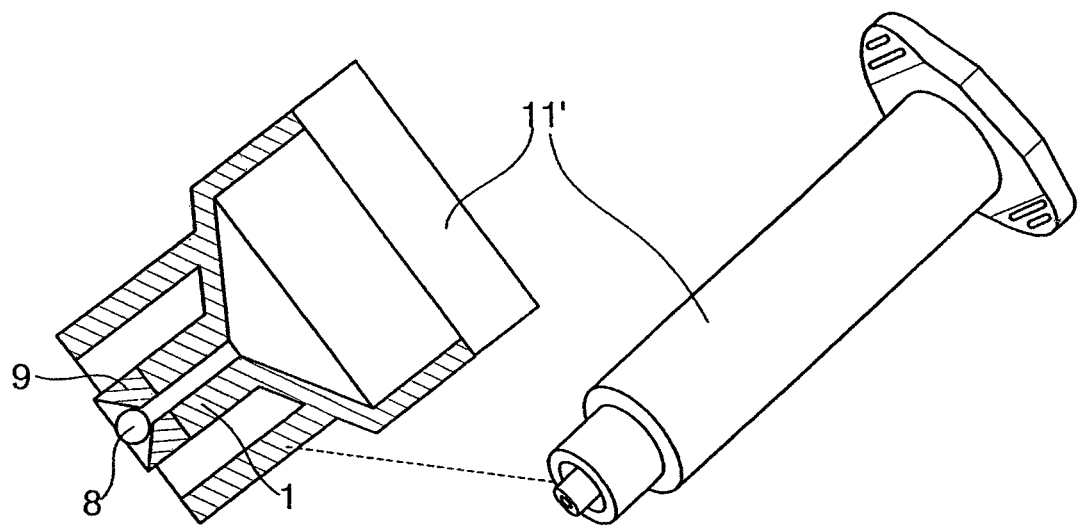
FIGS. 6a and b show views of a solenoid valve unit integrated in a cartridge unit.

A similar application is shown in FIG. 6, in which the solenoid valve unit is attached at the head side to an outlet opening of a cartridge unit 11' for dosed media dispensing. The solenoid valve unit, which also comprises the first magnet unit 1, the spacer element 9, and the spherical second magnet unit 8 in this case, is seated directly on the outlet opening of a cartridge head. It is obvious that upon closing of the solenoid valve unit, no dripping of the cartridge contents occurs because immediately after the closing of the valve passage opening, no material residue remains adhering on the outside of the spherical second magnet unit 8.

Figures 7A, 7B:
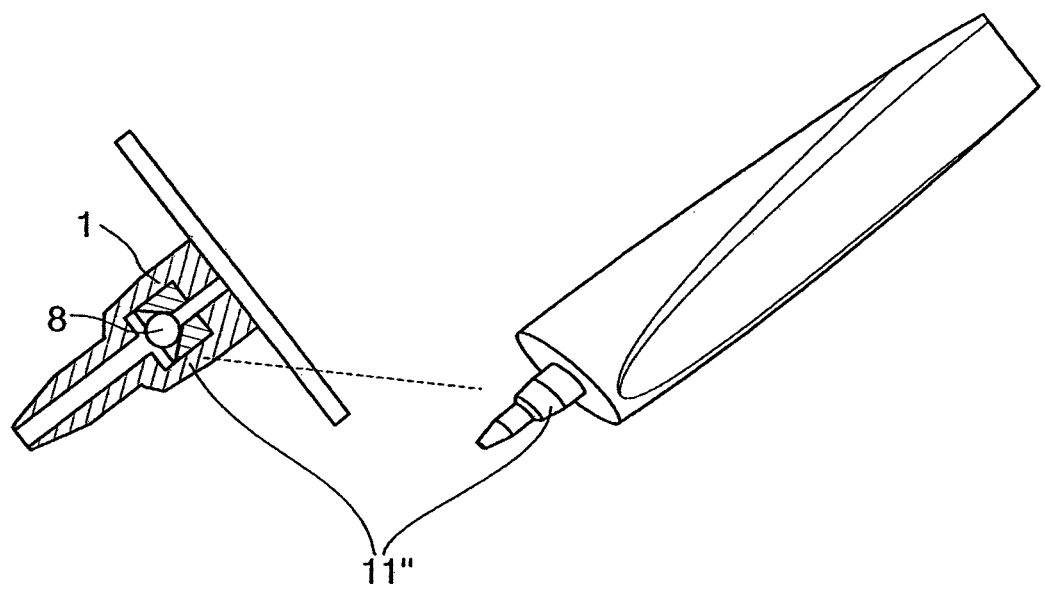
FIGS. 7a and b show views of a solenoid valve unit integrated in a tube head.

The use of the solenoid valve unit implemented according to the invention in the outlet area of a conventional tube opening is illustrated in FIG. 7, in which a solenoid valve unit implemented according to the invention, which only comprises the first magnet unit 1 and the second spherical magnet unit 8, for example, is integrated in a simple way inside the tube outlet neck 11". In connection with conventional adhesive tubes, the advantage of the solenoid valve unit implemented according to the invention is particularly clear, in particular because the valve unit automatically passes into an open valve state when a tube is deformed under the application of pressure and automatically re-closes the tube outlet neck as soon as pressure is no longer exerted on the tube. The solenoid valve unit implemented according to the invention additionally ensures the avoidance of annoying dripping of adhesive residues and helps to prevent hardening of the tube opening even without providing a closure cap.

Figure 8:
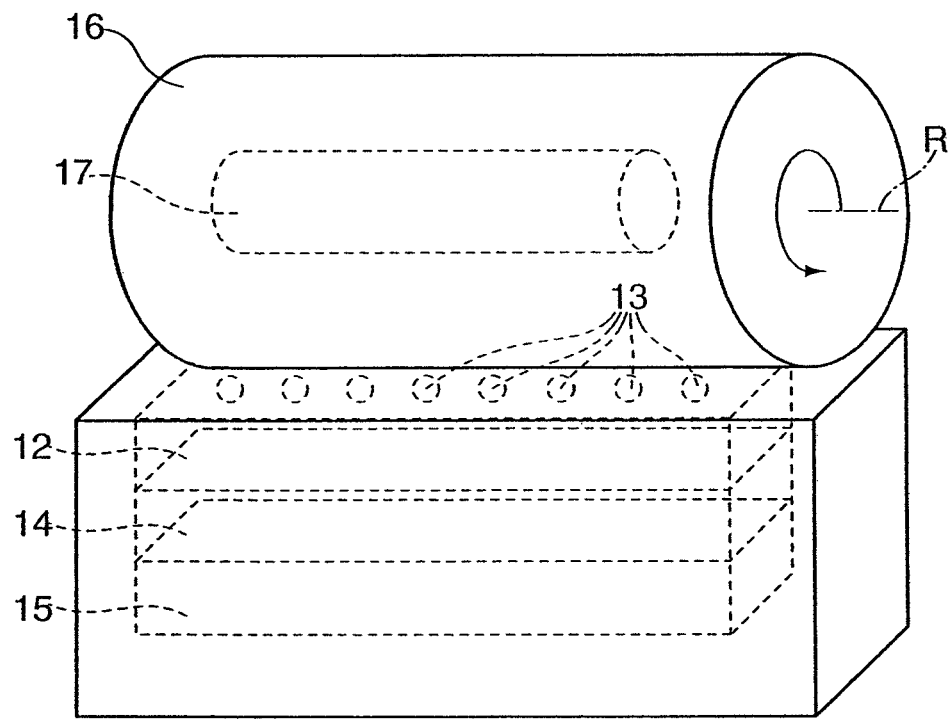
FIG. 8 shows a substrate surface having solenoid valve units arranged distributed in an array using external magnetic field valve triggering.
Figure 9:
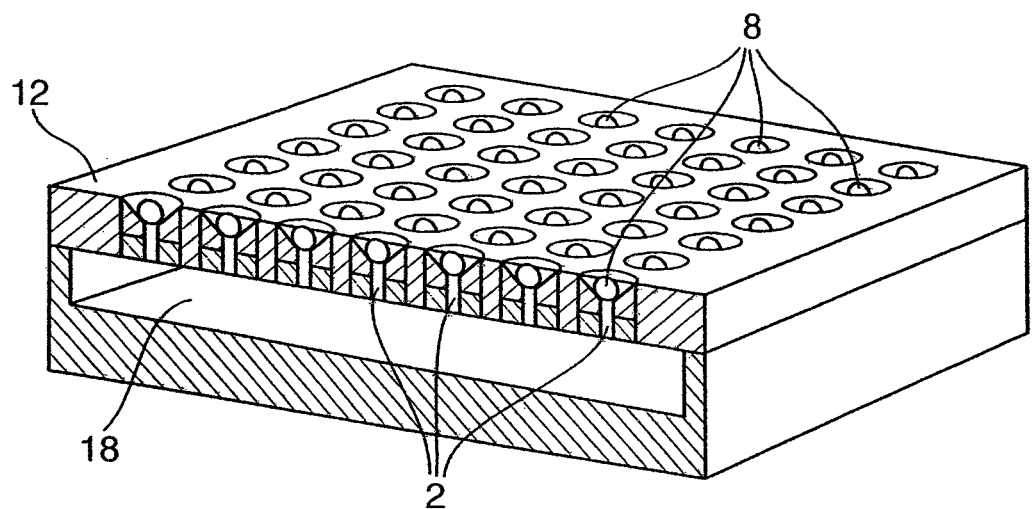
FIG. 9 shows a solenoid valve configuration distributed in an array along a substrate carrier surface having pressure-impinged media volumes.

The exemplary embodiments according to FIGS. 8 and 9 demonstrate further possible applications for a miniaturized construction of individual solenoid valve units. It is thus assumed in FIG. 8 that a plurality of hollow ducts 13, which are arranged in an array and completely penetrate the carrier substrate 12, are provided along a carrier substrate 12, in each of which a solenoid valve unit implemented according to the invention is introduced. The carrier substrate plate 12 closes a medium reservoir volume 14 on one side using its bottom side, in which, for example, viscous lubricant, such as oil, etc., is contained. A pressure supply 15, for example, in the form of a conveyor apparatus for the medium contained in the reservoir volume 14, for example, in the form of a lubricant, is in turn located below the medium reservoir volume 14. The pressure application to the lubricant stored in the medium reservoir volume 14 is performed in such a way that the solenoid valve units contained inside the passage ducts 13 assume a closed valve position, but upon only slight pressure increase, the solenoid valve units may be transferred into the open position. A roller body 16 mounted so it is rotatable above the carrier substrate plate 12 ensures the controlled opening of the individual solenoid valve units provided inside the hollow ducts 13, in which a bar-shaped permanent magnet 17 is integrated, which is capable of generating an external magnetic field, whereby upon corresponding spatial approach to the solenoid valve integrated inside the carrier substrate plate 12, the spherical second magnet unit 8 is attracted, whereby the magnet unit opens. In consideration of the exemplary embodiment in FIG. 8, it is obvious that the solenoid valve units attached in a line may each be transferred into the open position if the roller body 16 rolls directly over the corresponding solenoid valve units. If the roller body 16 moves away from the corresponding solenoid valve unit, the external magnetic field weakens and the open valve position is correspondingly returned to the closed valve position. The exemplary embodiment illustrated in FIG. 8 is preferably used in self-lubricating or self-greasing systems, in which at least two mechanical components are in mutual grinding or rolling contact.

FIG. 9 shows a similarly structured carrier substrate 12 having a plurality of solenoid valve units arranged in an array, under which a hermetically closed liquid reservoir 18 is located. In this case, the individual solenoid valve units open as a whole upon exceeding of a flow pressure introduced inside the liquid reservoir 18, which acts in each case from inside along the hollow duct 2, which is enclosed by each individual magnet unit, on the respective spherical second magnet unit 8. Using the device illustrated in FIG. 9, sliding or rolling surfaces in bearings may be lubricated flatly in a dosed way.

FIG. 10 shows a bottle-type container in longitudinal sectional illustration having a bottle opening 20, which is provided with a closure 21, in which a solenoid valve unit implemented according to the invention, comprising the first magnet unit 1, the spacer element 9, and the spherical second magnet unit 8, is provided. The closure 21 can be placed on various bottle openings and thus represents an independent closure cap. To operate the bottle closure, it is assumed that the bottle wall is deformable, so that an internal pressure increase can be initiated by compressing the bottle.

A further, bottle-type container is shown in FIG. 11, having a bottle outlet 20 and a bottle inlet 22. In the case of the bottle outlet 20, a solenoid valve unit is provided to let out a medium stored inside the bottle, while in contrast a solenoid valve implemented according to the invention, which is introduced in the reverse opening or closing direction, is integrated along the bottle inlet 22, for example, for purposes of ventilating the bottle volume. The bottle is again to be deformed correspondingly to open the solenoid valves.

Figure 12:
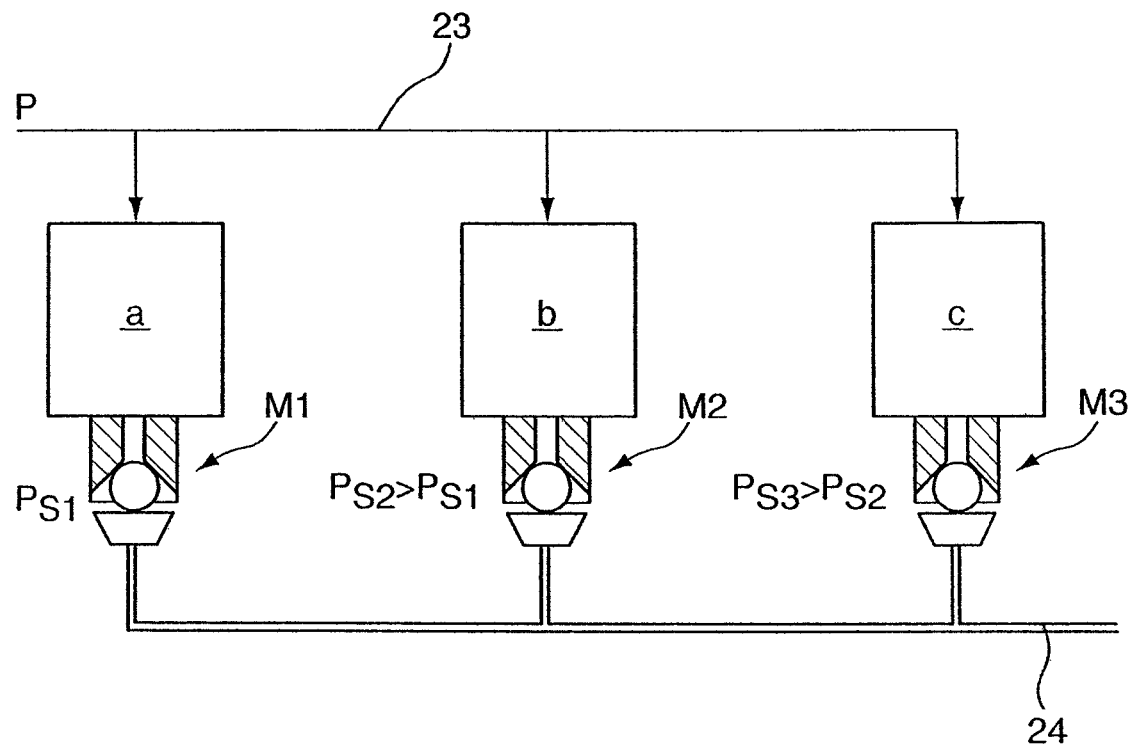
FIG. 12 shows a mixer configuration having multiple solenoid valves.

A mixer configuration, which provides three solenoid valves M1, M2, and M3, is shown in FIG. 12. Each individual solenoid valve is connected to a medium reservoir a, b, c, in each of which media to be mixed with one another are contained. The same delivery pressure P loads each individual medium reservoir a, b, c via a shared delivery pressure line 23. It is assumed that the solenoid valves a, b, c have different valve opening forces, which may be set with the aid of the above-described design parameters for implementation for the first and second magnet units 1, 8 and, if provided, for the additional spacer element. Thus, the solenoid valve M1 opens upon application of a delivery pressure $P_{S1}$, while in contrast the solenoid valves M2 and M3 remain closed. As a result, the medium from the medium reservoir reaches the manifold line 24 in the open valve position.

If the delivery pressure P is further increased and exceeds a delivery pressure $P_{S2}$, the solenoid valve M2 additionally opens, while the solenoid valve M3 still remains closed. In this case, mixing of the media from the media reservoirs a and b occurs along the manifold line 24.

If the delivery pressure is increased once again and exceeds a delivery pressure $P_{S3}$, the solenoid valve M3 also opens and mixing of all stored media a, b, c occurs along the manifold line 24.

The mixer configuration according to FIG. 12 illustrates a mixing principle for different media, which is exclusively based on the variation of a delivery pressure along a delivery pressure line, the opening forces, which are critical for opening and closing a solenoid valve, exclusively being fixed by specified design parameters for the implementation of the individual solenoid valves. An additional regulating mechanism, which requires electrical energy, is not necessary.

Figure 13:
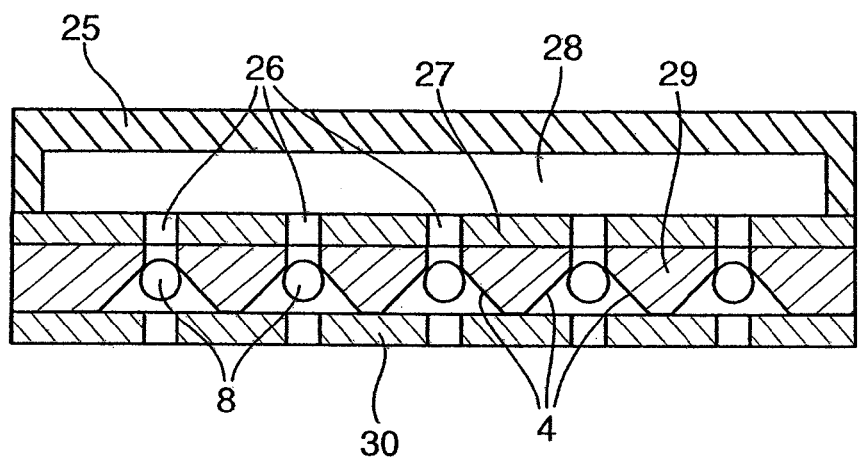
FIG. 13 shows a film-type solenoid valve configuration.

The exemplary embodiment of a solenoid valve configuration shown in FIG. 13 shows a cross-section through a line-shaped or array-shaped configuration of a plurality of individual solenoid valves, which are each implemented using film technology. Thus, a reservoir film 25 surrounds a magnetic film 27, which is perforated using passage openings 26, and encloses a reservoir volume 28 therewith, which is fillable using a fluid or gas (not shown). A valve seat film 29 adjoins flatly flush with the magnetic film 27, each having openings provided aligned with the through openings 26, at each of which the contact surface 4 implemented according to the invention adjoins, along which the ball 8 assigned to each solenoid valve unit is mounted so it can roll. Optionally, a nozzle film 30 is additionally provided, having nozzle openings for locally targeted media dispensing.

The film-type construction allows particularly cost-effective production of the solenoid valve configuration illustrated in FIG. 13, in particular because the individual films 25, 27, 29, and 30 must solely overlap appropriately and be joined to one another. Planar flexible solenoid valve units may be implemented in this way depending on the selection of the film materials and their film thicknesses.

LIST OF REFERENCE NUMERALS 1 first magnet unit
2 hollow duct
3 funnel-shaped recess
4 contact surface
5 flow opening
6 peripheral boundary
7 annular surface section
8 second magnet unit
9 spacer element
10 flexible hollow line
11 dispenser needle
11' dispenser unit
11" tube neck
12 surface substrate plate
13 through ducts
14 reservoir volume
15 pressure supply
16 roller body
17 bar magnet
18 reservoir volume
19 bottle-type container
20 bottleneck or bottle opening
21 closure
22 bottle inlet
23 delivery pressure line
24 manifold line
25 reservoir film
26 through openings
27 magnetic film
28 reservoir volume
29 valve seat film
30 nozzle film

The invention claimed is:

1. A solenoid valve for shutting off or enabling a flow of a medium along a hollow duct in response to application of pressure along the hollow duct, comprising:
at least one first hollow cylindrical magnet, including a flow opening, a circular cross-section on a downstream end thereof, fixed along the hollow duct in an axial section and radially surrounding the hollow duct and a contour surface which is angled relative to a plane intersecting and surrounding the flow opening;
a second magnet comprising a ball having a diameter greater than a diameter of the flow opening which is held in direct contact with the contour surface or with the first magnet or spaced apart from the first magnet by an attractive magnetic force between the magnets;
one of either means for applying a variable pressure to the medium which acts in a direction opposite to an action of the attractive magnetic force or means for varying the attractive magnetic force between the magnets; and wherein when the application of the variable pressure applied to the medium exceeds the attractive magnetic force, the ball is deflected away from sealing the hollow duct to unseal the hollow duct; and the at least one first hollow cylindrical magnet includes means for magnetically attracting the ball; and wherein the at least one first hollow cylindrical magnet and the contour surface or the means for varying the magnetic attractive force between the magnets are configured so that the ball when moving from a closed position of the valve to an open position of the valve is held in contact with the contour surface by the magnetic attractive force.

2. The solenoid valve according to claim 1, wherein the contour surface is funnel shaped, surrounds the flow opening and widens in the flow direction.

3. The solenoid valve according to claim 2, comprising:
an annular surface section within the plane which radially adjoins the flow opening.

4. The solenoid valve according to claim 1, comprising:
an annular surface section within the plane radially adjoins the flow opening.

5. The solenoid valve according to claim 1, wherein:
the contour surface is part of the first magnet.

6. The solenoid valve according to claim 5, wherein:
the spacer comprises a ferromagnetic material.

7. The solenoid according to claim 5, wherein:
the spacer comprises a non-ferromagnetic material.

8. The solenoid valve according to claim 1, wherein:
the contour surface is part of a spacer which spaces the ball from the first magnet and axially adjoins the first magnet.

9. The solenoid valve according to claim 1, wherein:
the first and second magnets either comprise a permanent magnetic material, or one of the two magnets comprises a permanent-magnetic material and another of the magnets comprises a ferromagnetic material.

10. The solenoid valve according to claim 1, wherein:
the circular flow opening on the downstream end of the first magnet is surrounded by a chamfered edge.

11. The solenoid valve unit according to claim 1, comprising:
a sealing layer applied at least to an area of the circular flow opening of the first magnet which engages the ball.

12. The solenoid valve according to claim 1 comprising:
a sealing layer applied to the second magnet.

13. The solenoid valve according to claim 1, wherein:
the second magnet comprises a magnetic film.

14. The solenoid valve according to claim 1 comprising:
a closure valve inside a dispenser for dispensing a dose of a medium from a reservoir.

15. The solenoid valve according to claim 14, wherein:
the dispensing unit is removably connected to the reservoir.

16. The solenoid valve according to claim 14, wherein:
the dispenser comprises a cover element having a screw or plug closure for a fluid-tight connection to the reservoir and the reservoir comprises one of a tube, can, bottle, or bag.

17. The solenoid valve according to claim 14, wherein:
the dispenser is permanently connected to the reservoir comprising one of a tube, can, bottle, or bag.

18. The solenoid valve according to claim 14, wherein:
the reservoir comprises a wall which is deformable by an external force action to provide dispensing of the dose.

19. The solenoid valve according to claim 14 for mixing at least two media, comprising:
at least two dispensers of the media with each dispenser including the solenoid valve with each solenoid valve having a different valve opening force; and wherein
the reservoir is connected to a shared delivery pressure line providing a specifiable delivery pressure of each media; and
the at least two dispensing units are connected to a shared manifold line in which dispensing of the media from each dispenser occurs.

20. The solenoid valve according to claim 1 comprising a closure valve inside a unit for a dosed filling of a volume.

21. The solenoid valve according to claim 20, wherein:
the unit provides dosed ventilation of the volume of a reservoir.

22. A plurality of solenoid valves according to the solenoid valve of claim 1 comprising:
a plurality of through ducts which penetrate a carrier substrate, are distributed in the carrier substrate and in which individual ones of the solenoid valves are housed in different ducts; and
the carrier substrate covers a reservoir in which the medium is to be stored to which pressure can be applied to dispense the medium.

23. A plurality of solenoid valves according to claim 22, wherein:
the through ducts are in an array along the carrier substrate.

24. The plurality of solenoid valves according to claim 23, wherein:
the carrier substrate surface facing away from the reservoir provides a sliding or rolling surface for at least one sliding or rolling body.

25. The plurality of solenoid valves according to claim 22, wherein:
the carrier substrate surface facing away from the reservoir provides a sliding or rolling surface for at least one sliding or rolling body.

26. A plurality of solenoid valves according to the solenoid valve of claim 1 comprising:
a plurality of through ducts which penetrate a carrier substrate, are distributed in the carrier substrate and in which individual ones of the solenoid valves are housed in different ducts;
the carrier substrate covers a reservoir in which a medium is to be stored to which pressure can be applied to dispense the medium; and
at least one magnet providing an external magnetic field, the at least one magnet being guided along a side of the carrier substrate, which faces away from the reservoir for opening the solenoid valves and at least temporarily reduces a magnetic retaining force between the first and second magnets of each one of the solenoid valves.

27. A plurality of solenoid valves according to claim 26, wherein:
the through ducts are in an array along the carrier substrate.

28. The plurality of solenoid valves according to claim 26, wherein:
the carrier substrate surface facing away from the reservoir provides a sliding or rolling surface for at least one sliding or rolling body.

* * * * *